United States Patent
Kim et al.

(10) Patent No.: US 10,187,380 B2
(45) Date of Patent: Jan. 22, 2019

(54) USER DEVICE, METHOD FOR SETTING PASSWORD THEREOF, AND OPERATING METHOD FOR SETTING AND VERIFYING PASSWORD THEREOF

(71) Applicant: SAMSUNG ELECTRONICS CO., LTD., Suwon-si (KR)

(72) Inventors: Sunghyun Kim, Anyang-si (KR); Sungkyoung Kim, Hwaseong-si (KR); Hyosun Hwang, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 190 days.

(21) Appl. No.: 15/197,955

(22) Filed: Jun. 30, 2016

(65) Prior Publication Data
US 2017/0006015 A1 Jan. 5, 2017

(30) Foreign Application Priority Data
Jul. 2, 2015 (KR) .......................... 10-2015-0094815

(51) Int. Cl.
*H04L 29/06* (2006.01)

(52) U.S. Cl.
CPC ............ *H04L 63/083* (2013.01); *H04L 63/20* (2013.01)

(58) Field of Classification Search
CPC ... H04L 63/08; H04L 63/083; H04L 63/0853; H04L 63/0876; H04L 63/12
See application file for complete search history.

(56) References Cited

U.S. PATENT DOCUMENTS

| | | | | |
|---|---|---|---|---|
| 6,970,827 | B2 * | 11/2005 | Zeltzer | G06F 17/30575 705/2 |
| 7,178,025 | B2 * | 2/2007 | Scheidt | G06F 21/31 705/67 |
| 7,353,536 | B1 * | 4/2008 | Morris | G06F 21/31 709/203 |
| 7,653,818 | B2 * | 1/2010 | Serpa | G06F 21/31 340/5.54 |
| 7,679,133 | B2 | 3/2010 | Son et al. | |
| 8,214,892 | B2 | 7/2012 | Cohen et al. | |
| 8,347,103 | B2 | 1/2013 | Jones et al. | |
| 8,392,975 | B1 | 3/2013 | Raghunath | |
| 8,499,342 | B1 | 7/2013 | MacWan | |
| 8,553,466 | B2 | 10/2013 | Han et al. | |
| 8,558,790 | B2 | 10/2013 | Kim | |
| 8,559,235 | B2 | 10/2013 | Yoon et al. | |
| 8,654,587 | B2 | 2/2014 | Yoon et al. | |
| 8,732,477 | B2 | 5/2014 | Osborn et al. | |
| 8,881,251 | B1 * | 11/2014 | Hilger | H04L 63/083 713/183 |
| 8,938,797 | B2 | 1/2015 | Bedworth | |

(Continued)

FOREIGN PATENT DOCUMENTS

KR 10-1381799 B1 4/2014

*Primary Examiner* — Eric W Shepperd
(74) *Attorney, Agent, or Firm* — Sughrue Mion, PLLC (57) ABSTRACT

A method for setting a password for operating an application of a user device is provided. The method includes requesting the user device to input a password of the application, and requesting the user device to select device binding information of the user device to associate with the password. The device binding information is obtained from one or more of contact information, a photo, an e-mail, a file, or an address.

17 Claims, 13 Drawing Sheets

(56) References Cited

U.S. PATENT DOCUMENTS

| | | | |
|---|---|---|---|
| 8,997,177 | B2 | 3/2015 | Yudkin et al. |
| 9,037,993 | B2 | 5/2015 | McLean |
| 9,246,686 | B1* | 1/2016 | Holland ............... H04L 9/3236 |
| 2003/0182232 | A1* | 9/2003 | Zeltzer ............. G06F 17/30575 |
| | | | 705/51 |
| 2008/0092216 | A1* | 4/2008 | Kawano ................. G06F 21/46 |
| | | | 726/5 |
| 2008/0235772 | A1* | 9/2008 | Janzen ................... G06F 21/31 |
| | | | 726/5 |
| 2008/0313721 | A1* | 12/2008 | Corella .................. G06F 21/31 |
| | | | 726/6 |
| 2008/0320310 | A1* | 12/2008 | Florencio ............... G06F 21/31 |
| | | | 713/184 |
| 2009/0037986 | A1 | 2/2009 | Baker |
| 2009/0077653 | A1 | 3/2009 | Osborn et al. |
| 2009/0121271 | A1 | 5/2009 | Son et al. |
| 2009/0143052 | A1* | 6/2009 | Bates ............... G06F 17/30575 |
| | | | 455/414.2 |
| 2010/0180336 | A1 | 7/2010 | Jones et al. |
| 2010/0239087 | A1* | 9/2010 | Chaisson ............... G06F 21/46 |
| | | | 380/44 |
| 2010/0287382 | A1* | 11/2010 | Gyorffy ................. G06F 21/36 |
| | | | 713/185 |
| 2011/0016520 | A1 | 1/2011 | Cohen et al. |
| 2011/0202982 | A1 | 8/2011 | Alexander et al. |
| 2011/0216603 | A1 | 9/2011 | Han et al. |
| 2011/0233648 | A1 | 9/2011 | Seol et al. |
| 2012/0051143 | A1 | 3/2012 | Yoon et al. |
| 2012/0066505 | A1* | 3/2012 | Brown ................. H04L 9/0822 |
| | | | 713/183 |
| 2012/0110498 | A1* | 5/2012 | McLean ................ G06F 21/36 |
| | | | 715/780 |
| 2013/0021249 | A1 | 1/2013 | Bedworth |
| 2013/0138968 | A1 | 5/2013 | Yudkin et al. |
| 2013/0232437 | A1 | 9/2013 | Kim |
| 2013/0279262 | A1 | 10/2013 | Yoon et al. |
| 2014/0223550 | A1 | 8/2014 | Nagar |
| 2014/0310805 | A1 | 10/2014 | Kandekar |
| 2014/0359734 | A1 | 12/2014 | Natividad |
| 2014/0380508 | A1 | 12/2014 | Cao |
| 2015/0249658 | A1* | 9/2015 | Lee ...................... H04L 63/083 |
| | | | 726/6 |
| 2015/0287432 | A1* | 10/2015 | Nakano .................. G06F 21/10 |
| | | | 386/259 |
| 2016/0381009 | A1* | 12/2016 | Liou ................... H04L 63/0838 |
| | | | 726/7 |

\* cited by examiner

USER DEVICE, METHOD FOR SETTING
PASSWORD THEREOF, AND OPERATING
METHOD FOR SETTING AND VERIFYING
PASSWORD THEREOF

CROSS-REFERENCE TO RELATED APPLICATIONS

The present application claims priority, under 35 U.S.C. § 119, from Korean Patent Application No. 10-2015-0094815 filed on Jul. 2, 2015, in the Korean Intellectual Property Office, the entire contents of which are hereby incorporated by reference.

BACKGROUND

1. Field

Apparatuses and methods consistent with exemplary embodiments relate to a user device, and more particularly, relate to a user device, a method for setting a password thereof, and an operating method for setting and verifying a password thereof.

2. Related Art

User devices include electronic devices such as mobile electronic devices, such as tablet Personal computers (PCs), smart phones, and laptop computers, and desktop computers. With the development of electronic communication technologies, user devices may have a fast communication speed and may transmit or receive a large amount of data. Smart phones among the user devices have been developed into intelligent terminals that perform general computer functions, internet communication functions and information retrieval functions.

Users of smart phones may directly connect to the Internet using a wireless communications and may connect with the Internet in various ways using several browsing programs. Moreover, users of smart phones may directly develop applications or may install various applications through the Internet. Users of smart phones may share applications between smart phones having the same operating system (OS).

As applications are implemented to work with the internet of things (IoT) or wearable devices, users may more conveniently use various applications. Particularly, users may also use applications, such as banking applications for security is important.

To more securely use these applications, users set a password for each of the applications when using the applications. Users set a password of some digits or more and include special characters in the password. However, if someone other than the user knows a user's password for an application, they may log into other devices with the user's information and may use the corresponding application.

SUMMARY

Exemplary embodiments of the inventive concept provide a user device which may more securely execute a corresponding application, a method for setting a password thereof, and an operating method for setting and verifying a password thereof.

According to an aspect of an exemplary embodiment, a method for setting a password for operating an application of a user device is provided. The method may include requesting the user device to input a password of the application and requesting the user device to select device binding information (DBI) of the user device to associate with the password.

The DBI may be unique user information stored in the user device. The DBI may be obtained from one or more of contact information, a photo, an e-mail, a file, or an address. The DBI may be matched with all or some of characters of the password.

According to an aspect of another exemplary embodiment, a method for operating an application of a user device is provided. The method may include setting a password of the application by requesting the user device to input the password and requesting the user device to select device binding information (DBI) of the user device to associate with the password and verifying the password to operate the application in which the password is set.

According to an aspect of another exemplary embodiment, a user device is provided. The user device may include a wireless internet unit configured to communicate with the outside to execute an application, an operating system configured to provide an environment to execute the application, a memory configured to save a password of the application, and an input and output interface unit configured to input the password. The application may set the password of the application by requesting the user device to input the password and requesting the user device to select device binding information (DBI) of the user device to associate with the password.

According to an aspect of another exemplary embodiment, a method for setting a password for operating an application of a user device is provided. The method includes: receiving a password of the application; selecting device binding information (DBI) of the user device, the DBI being unique user information stored in the device; and binding the DBI with the password.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION OF THE EXEMPLARY EMBODIMENTS

Hereinafter, exemplary embodiments of the inventive concept will be described in detail with reference to the accompanying drawings so that they may be easily practiced and understood by those skilled in the art to which the inventive concept pertains.

Figure 1:
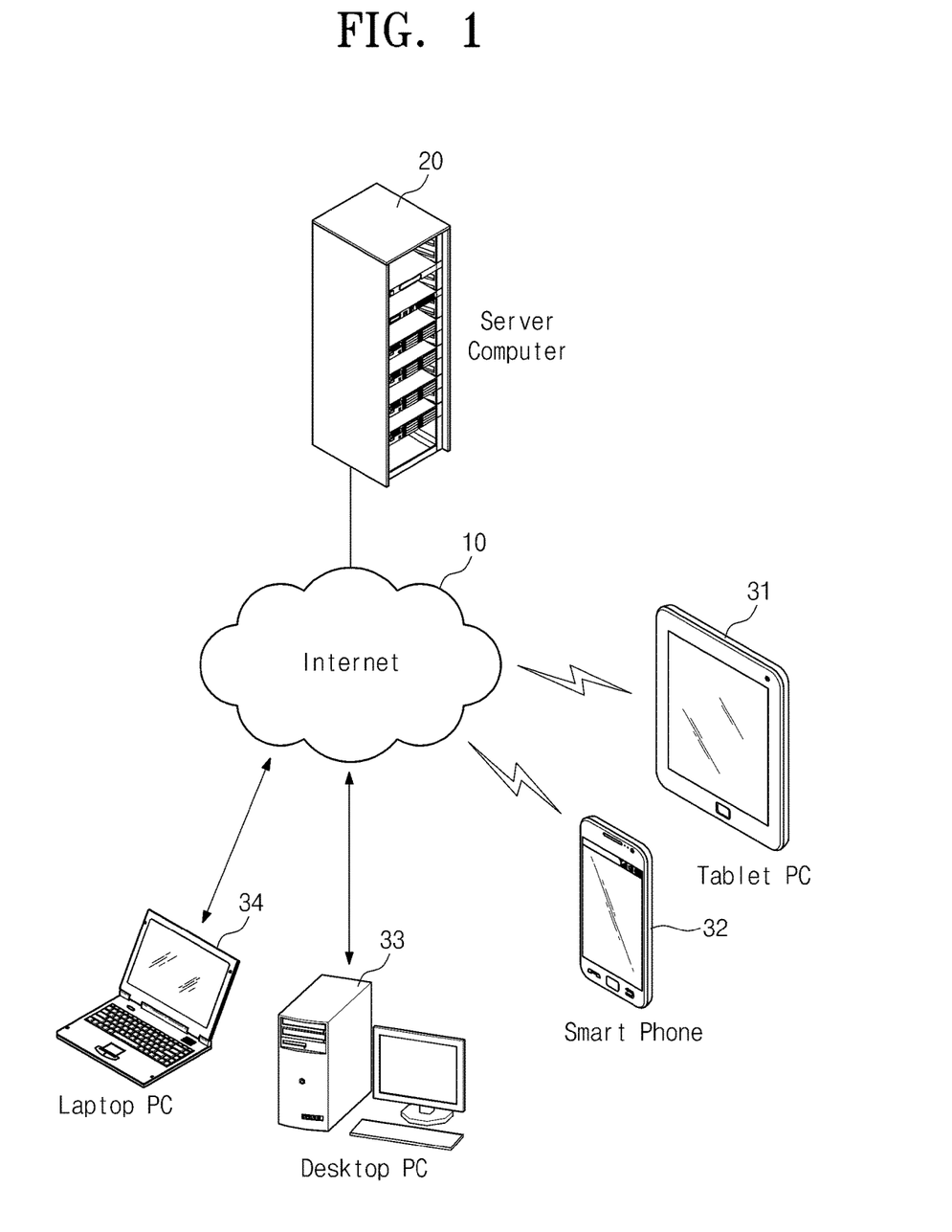
FIG. 1 is a drawing illustrating user devices according to an exemplary embodiment.

FIG. 1 is a drawing illustrating user devices according to an exemplary embodiment of the inventive concept. Referring to FIG. 1, user devices according to an exemplary embodiment of the inventive concept may include electronic devices such as a tablet personal computer (PC) 31, a smart phone 32, a desktop PC 33, and a laptop PC 34. Each of these user devices may connect with a server computer 20 through the Internet 10.

Each of the user devices may save a computer program for performing a specific task or various applications. As applications are implemented to work with the Internet of things (IoT) or a wearable device, a user may execute more convenient, various applications. For example, the user may perform a task such as an account transfer without visiting a bank by using a banking application through a smart phone.

Each of the user devices may set a password to more securely use this application. For example, to use a banking application, the user inputs a password of some digits or more, changes arrangement of characters for inputting a password, or includes special characters or numbers in a password. However, if others know the password of an application of the user in this case, they may log in to other devices with a name of the user and may execute the corresponding application.

Figure 2:
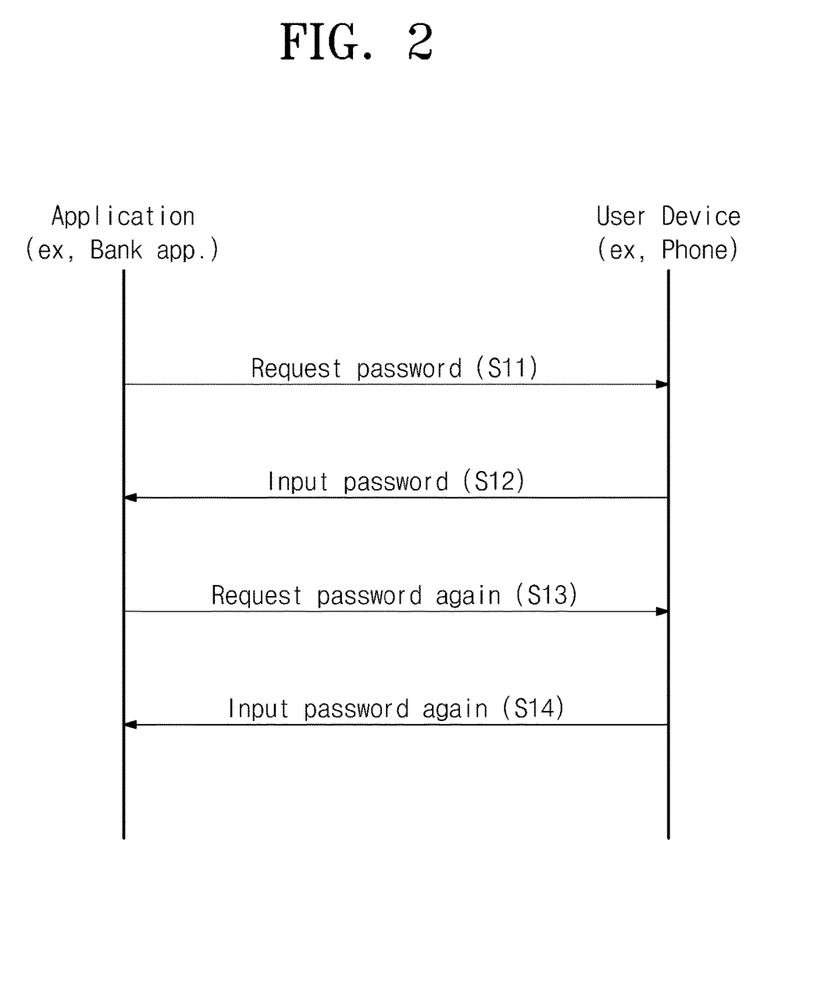
FIGS. 2 and 3 are signal sequence diagrams illustrating a method for setting a password and a method for verifying a password, which are generally used in a user device, according to an exemplary embodiment.
Figure 3:
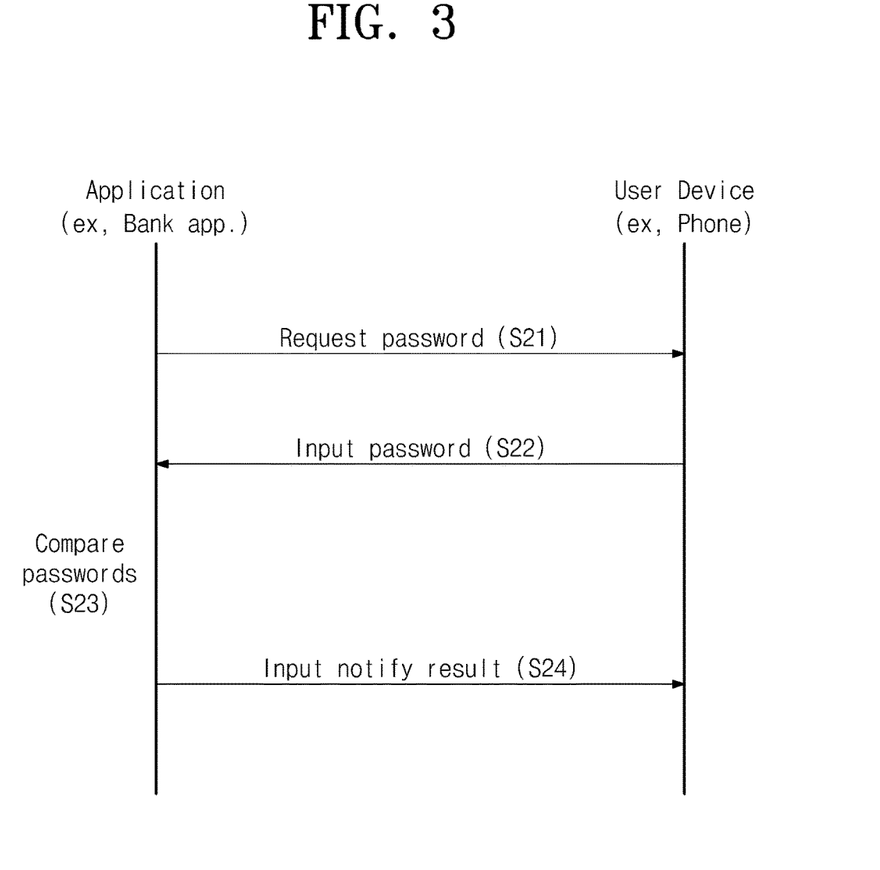

FIGS. 2 and 3 are signal sequence diagrams illustrating a method for setting a password and a method for verifying a password, which are generally used in a user device, according to an exemplary embodiment of the inventive concept. Referring to FIG. 2, in operation S11, an application may request a user device to input a password. In operation S12, the password is input in response to the request for inputting the password of the application. In operation S13, the application may request the user device again to input the password for security. In operation S14, the password is input again in response to the request for inputting the password of the application.

Referring to FIG. 3, when using an application (e.g., a banking application), a user device may perform a procedure of verifying a password. In operation S21, the application may request the user device to input its password. In operation S22, the password is input in response to the request for inputting the password of the application. In operation S23, the application may compare a predetermined password with the input password. When the passwords are identical to each other, the application is executed. When the passwords are different from each other, in operation S24, the application may notify the user device of the result that the passwords are different from each other.

The user device according to an exemplary embodiment of the inventive concept may set a password in various ways to securely use the application. For example, according to an exemplary embodiment of the inventive concept, the user device may use its device binding information (DBI) when setting a password. Therefore, according to an exemplary embodiment of the inventive concept, although others know a password of an application of a user, unless they have unique user information, they may not log in to the application with a name of the user and may not use the corresponding application.

Figure 4:
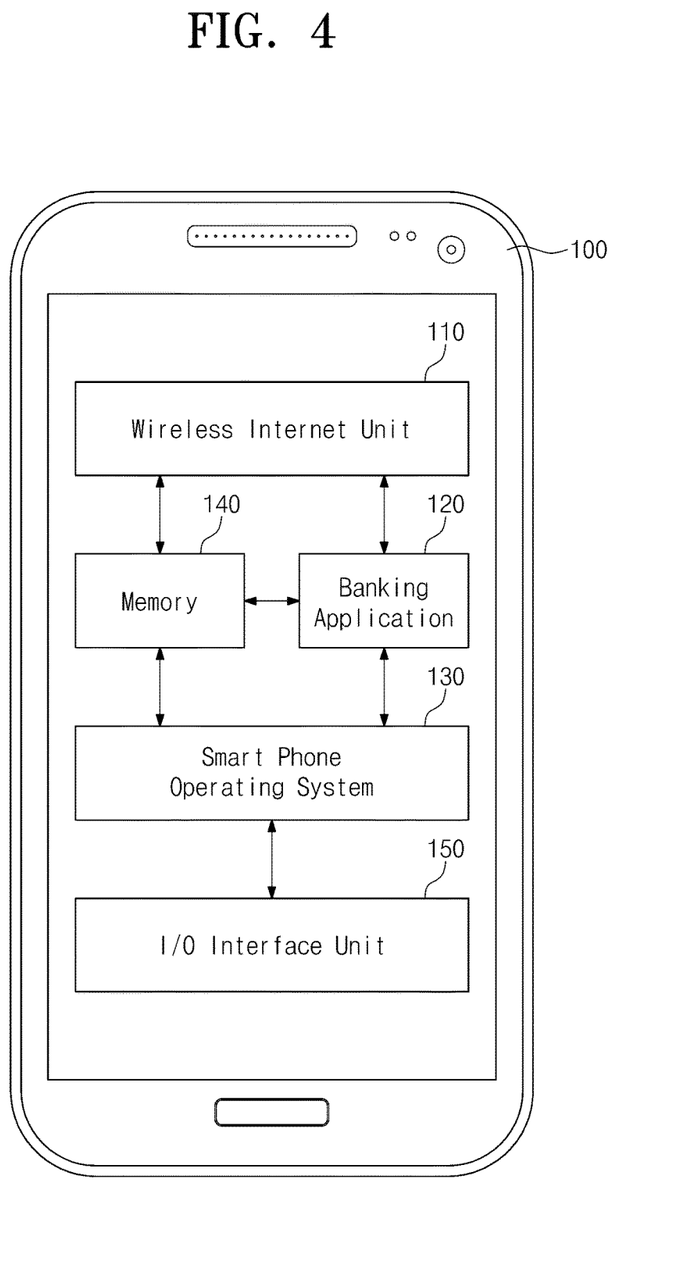
FIG. 4 is a block diagram illustrating a configuration of a user device according to an exemplary embodiment.

FIG. 4 is a block diagram illustrating a configuration of a user device according to an exemplary embodiment of the inventive concept. FIG. 4 illustrates a smart phone among user devices as an example. Referring to 4, a user device 100 may include a processor, a wireless internet unit 110, a banking application 120, a smart phone operating system 130, a memory 140, and an input and output (I/O) interface unit 150 (e.g., an input/output interface, etc.).

The wireless internet unit 110 may wirelessly connect the user device 100 to the Internet. The user device 100 may receive and transmit data with an external device, such as another user device or a server computer, through the wireless internet unit 110.

The banking application 120 may be an application program which is installed and executed on the smart phone operating system 130. The banking application 120 may provide a user interface, which may perform online financial transactions, to a user. The banking application 120 may transmit and receive data through the smart phone operating system 130 and the I/O interface unit 150.

The smart phone operating system 130 may provide an environment in which the banking application 120 may be executed. When a password of the banking application 120 is set, the memory 140 may save the set password. The memory 140 may include a volatile memory which loses data when the user device 100 is powered off and a non-volatile memory which maintains data when the user device 100 is powered off. The memory 140 may save a program, such as the banking application 120 or the smart phone operating system 130, as well as the password. The I/O interface unit 150 may be used to input a password when the password of the banking application 120 is set or verified.

Figure 5:
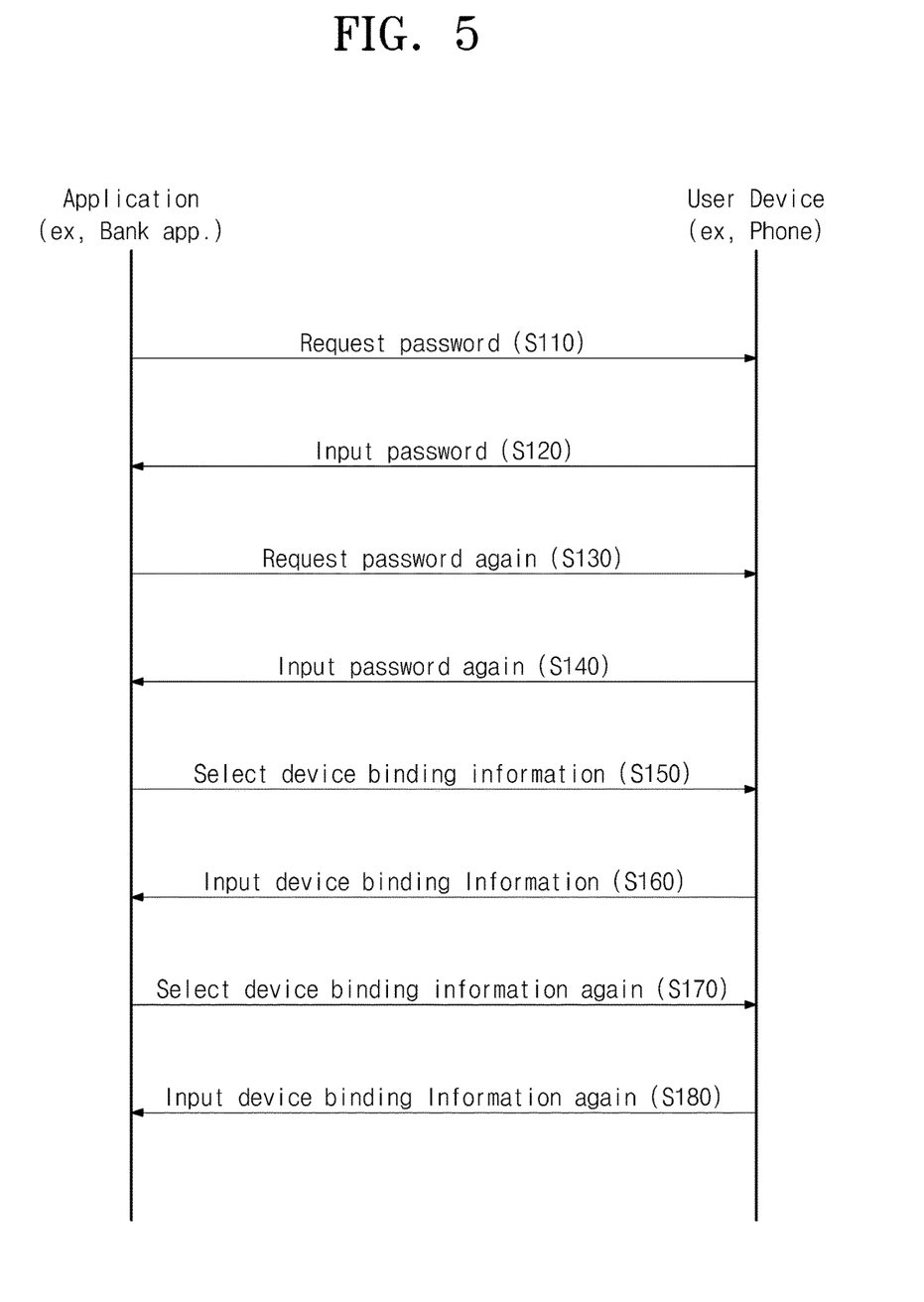
FIG. 5 is a signal sequence diagram illustrating a method for setting a password of an application of a user device shown in FIG. 4 according to an exemplary embodiment.

FIG. 5 is a signal sequence diagram illustrating a method for setting a password of an application of a user device shown in FIG. 4 according to an exemplary embodiment of the inventive concept. Referring to FIG. 5, to securely use a banking application 120 of FIG. 4, a method of setting a password in a user device 100 of FIG. 4 is shown.

In operation S110, the banking application 120 may request the user device 100 to input its password. In operation S120, a user of the user device 100 may input the password through an I/O interface unit 150 of FIG. 4 in response to the request for inputting the password of the banking application 120. In operation S130, the banking application 120 may request the user device 100 again to input the password to verify whether the password is accurately input. In operation S140, the user may input the password again in response to the request for inputting the password of the banking application 120.

After inputting the password, an operation S160 of inputting device binding information (DBI) is performed. Herein, the DBI may be unique user information which is saved in a smart phone or a tablet PC of the user. The unique user information may include an image such as a photo and information such as a contact name or a contact phone number. Therefore, in FIG. 5, according to an exemplary embodiment of the inventive concept, to access the banking application 120, the user should know the password and the user device 100 should save unique user information.

Returning again to FIG. 5, in operation S150, the banking application 120 may request the user device 100 to select DBI. The user may select and input the DBI in response to the request for selecting the DBI. In operation S170, to securely use the DBI, the banking application 120 may request the user device 100 again to select the DBI. In operation S180, the user input the DBI again in response to the request for selecting the DBI.

The password may be saved in a memory 140 of the user device 100 together with the DBI in a process below.

Figure 6:
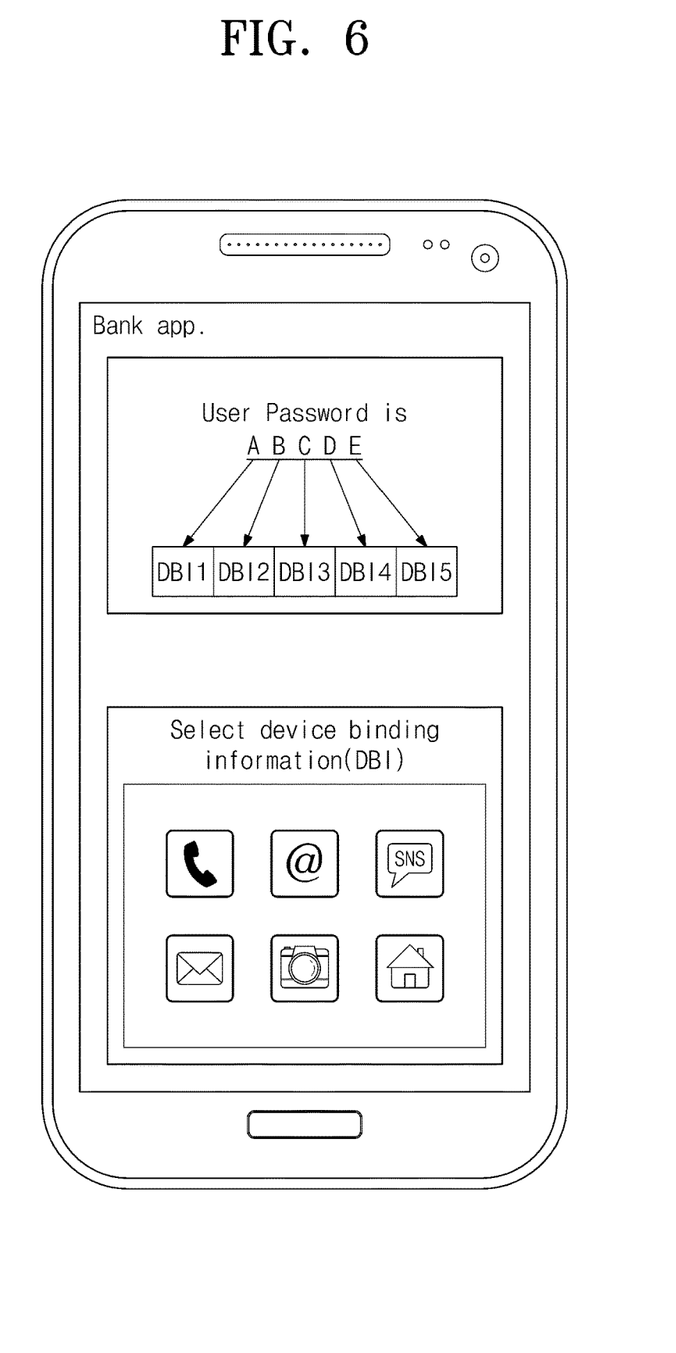
FIGS. 6, 7, 8, and 9 are conceptual diagrams illustrating a method for setting device binding information (DBI) according to an exemplary embodiment.

[Password Character+Device Binding Information]
⇒ One way encryption function
⇒ Password bound with specific user device FIGS. 6, 7, 8, and 9 are conceptual diagrams illustrating a method for setting device binding information (DBI) according to an exemplary embodiment of the inventive concept. Referring to FIG. 6, after a password is set, DBI corresponding to each character of the password is set. For example, when the password is ABCDE, DBI DBI1 is added to A, DBI DBI2 is added to B, DBI DBI3 is added to C, DBI DBI4 is added to D, and DBI DBI5 is added to E.

The DBI may be unique user information which is saved in a user device 100 of FIG. 4. The DBI may be one or more of several unique information such as contact information, a place or position, a social networking service (SNS), an e-mail, a photo, an address book, a file, and music. For example, all of the DBI1 to the DBI 5 may be selected among photos. Alternatively, all of the DBI1 to the DBI 5 may be selected among contact information. Alternatively, the DBI1 and the DBI2 may be selected among photos, DBI3 and DBI4 may be selected among contact information, and the DBI5 may be selected among e-mails.

Figure 7:
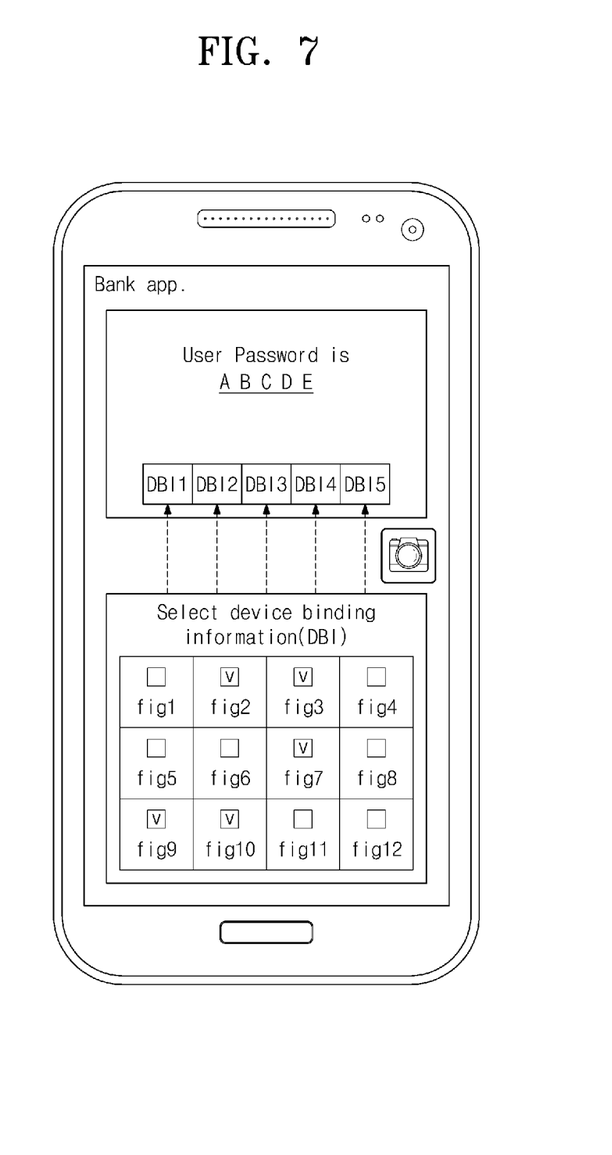

FIG. 7 is a conceptual diagram illustrating an example in which all of DBI1 to DBI5 are selected. Referring to FIG. 7, $1^{st}$ to $12^{th}$ photos fig1 to fig12 may be saved in a photo list of a user device 100 of FIG. 4. In FIG. 7, the $2^{nd}$ photo fig2, the $3^{rd}$ photo fig3, the $7^{th}$ photo fig7, the $9^{th}$ photo fig9, and the $10^{th}$ photo fig10 may be selected as DBI.

Herein, the DBI1 to the DBI5 may be determined in an order in which photos are selected or in order of names of selected files. Alternatively, the DBI1 to the DBI5 may be determined in any order by a user. For example, the $7^{th}$ photo fig7 may be selected as the DBI1, and the $2^{nd}$ photo fig2 may be selected as the DBI2. The $9^{th}$ photo fig9 may be selected as the DBI3, the $10^{th}$ photo fig10 may be selected as the DBI4, and the $3^{rd}$ photo fig3 may be selected as the DBI5.

Figure 8:
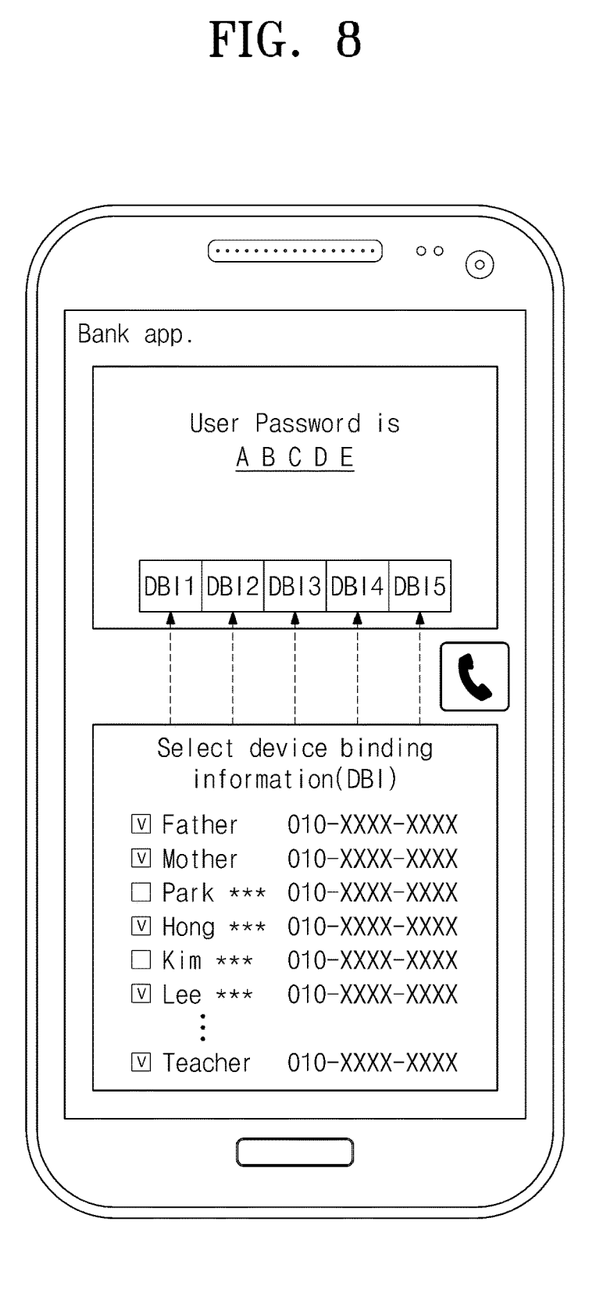

FIG. 8 is a conceptual diagram illustrating an example in which all of DBI1 to DBI5 are selected. Referring to FIG. 8, phone numbers of many people may be saved in a contact information list of a user device 100 of FIG. 4. In FIG. 8, phone numbers of father, mother, hong, lee, and teacher may be selected as DBI. The phone number of the father may be selected as the DBI1, the phone number of the mother may be selected as the DBI2, and the phone number of the hong may be selected as the DBI3. The phone number of the lee may be selected as the DBI4, and the phone number of the teacher may be selected as the DBI5.

Figure 9:
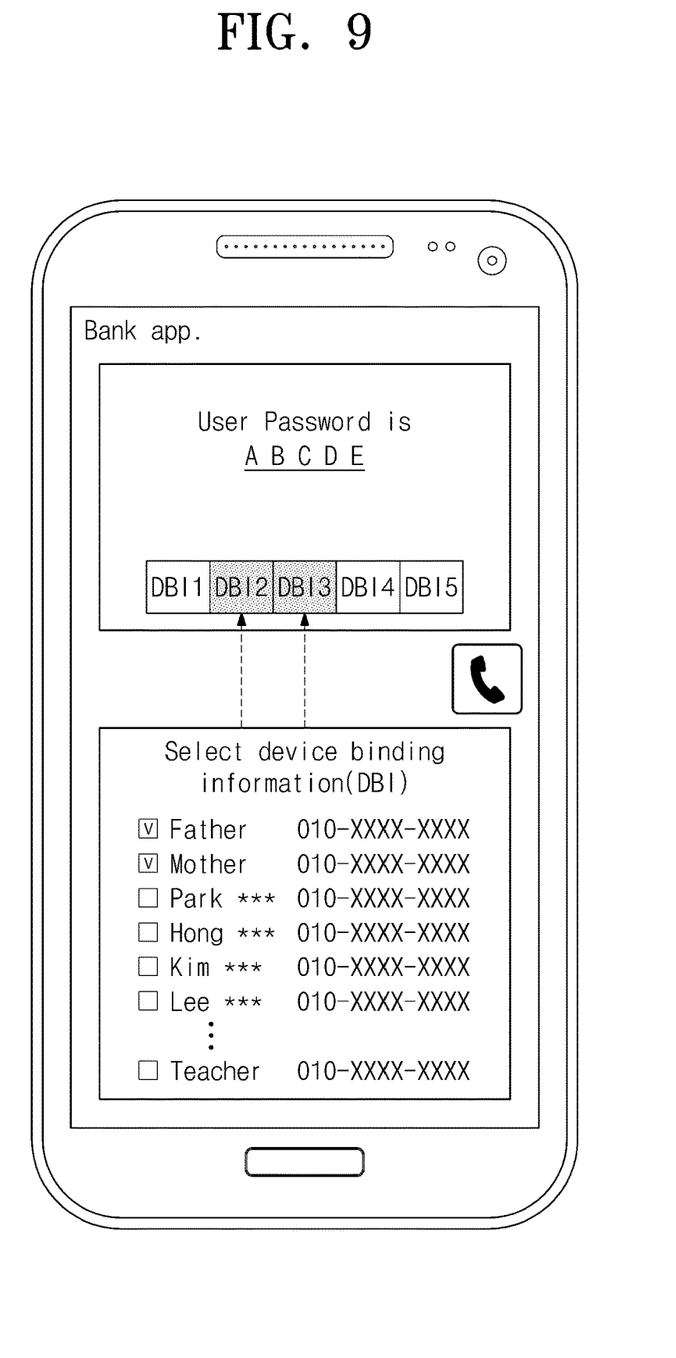

FIG. 9 is a conceptual diagram illustrating an example in which some (e.g., DBI2 and DBI3) of DBI1 to DBI5 are selected. DBI may be input in response to all digits of characters of a password. However, as shown in FIG. 9, the DBI may be set to be input to some of digits of the characters of the DBI. In FIG. 9, the DBI may be set to be input to second and third digits of the characters of the DBI.

Since the password has 5 digits, the number of cases in which the password may be set may be 31 by Equation 1 below.

$$5C1+5C2+5C3+5C4+5C5=5+10+10+5+1=31 \quad \text{Equation 1}$$

As such, although others know a password of an application of a user, it is impossible for them to log in to the application with a name of the user and operate the corresponding application by matching the DBI with all or some of the characters of the password. When unique user information in the user device 100 is deleted, the user may set a password and DBI again.

Figure 10:
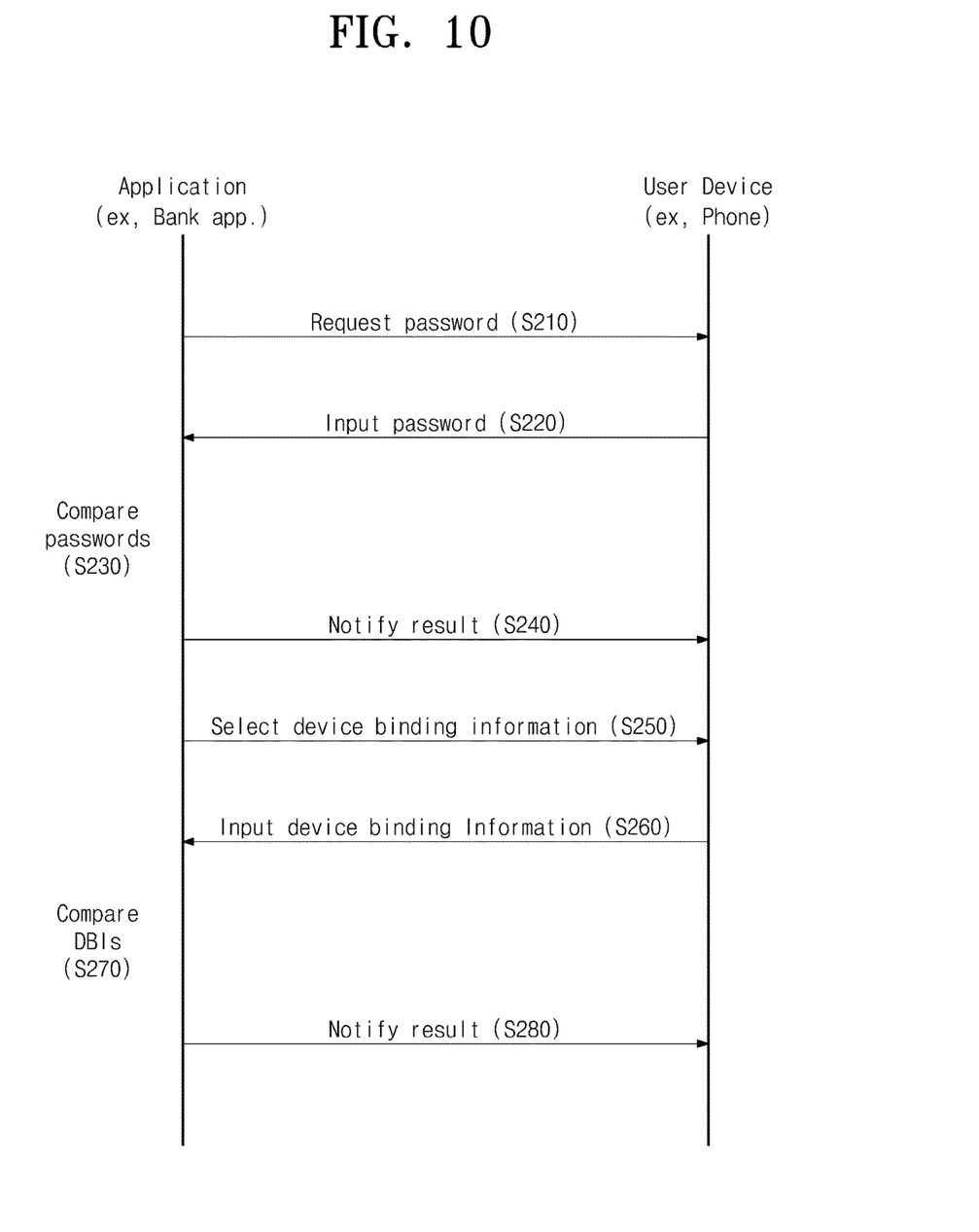
FIG. 10 is a signal sequence diagram illustrating a method for verifying a password of an application of a user device shown in FIG. 4 according to an exemplary embodiment.

FIG. 10 is a signal sequence diagram illustrating a method for verifying a password of an application of a user device shown in FIG. 4 according to an exemplary embodiment of the inventive concept. FIG. 10 illustrates a process of verifying a password to use a banking application 120 of FIG. 4.

Referring to FIG. 10, in operation S210, the banking application 120 may request a user device 100 of FIG. 4 to input its password. In operation S220, the user may input the password through an I/O interface unit 150 of FIG. 4. In operation S230, the banking application 120 may compare a predetermined password with the input password. In operation S240, the banking application 120 may notify the user device 100 of the result of whether the passwords are identical to each other. When the passwords are different from each other, the banking application 120 may notify the user of the result that the passwords are different from each other. When the passwords are identical to each other, an operation of verifying DBI may be performed.

Referring again to FIG. 10, in operation S250, the banking application 120 may request the user device 100 to select DBI. In operation S260, the user may input the DBI through the I/O interface unit 150 in response to the request for selecting the DBI of the banking application 120. In operation S270, the banking application 120 may compare predetermined DBI with the input DBI. When the input DBI is different from the predetermined DBI, in operation S280, the banking application 120 may notify the user of the result that the input DBI is different from the predetermined DBI. When the input DBI is identical to the predetermined DBI, the banking application 120 may be executed.

Figure 11:
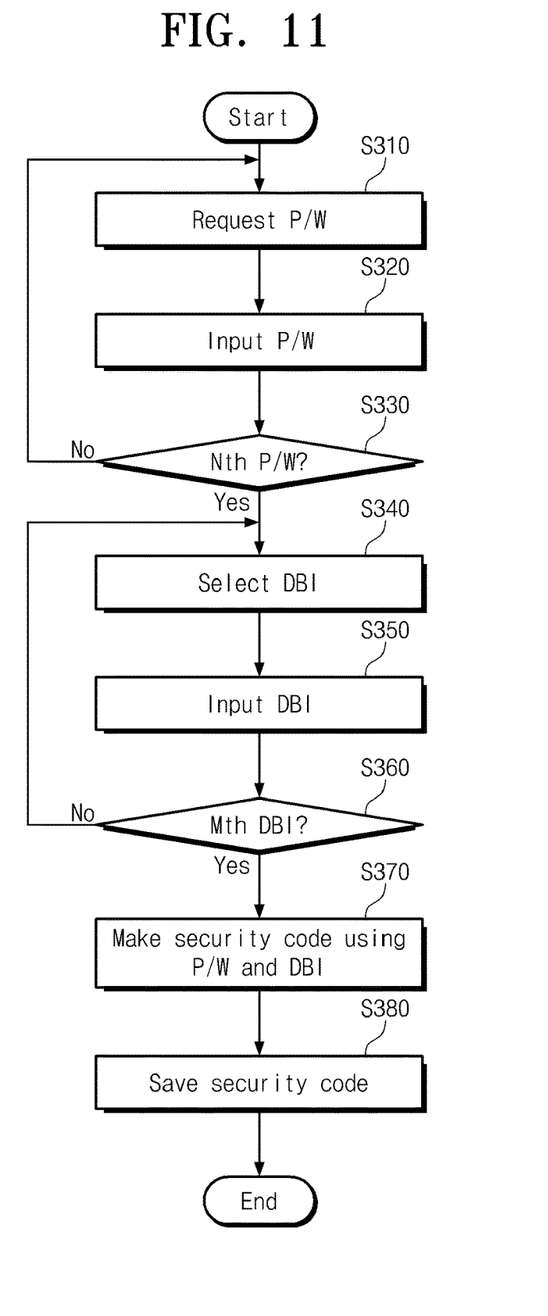
FIGS. 11 and 12 are flowcharts illustrating a method for setting and verifying a password of a user device according to another exemplary embodiment.
Figure 12:
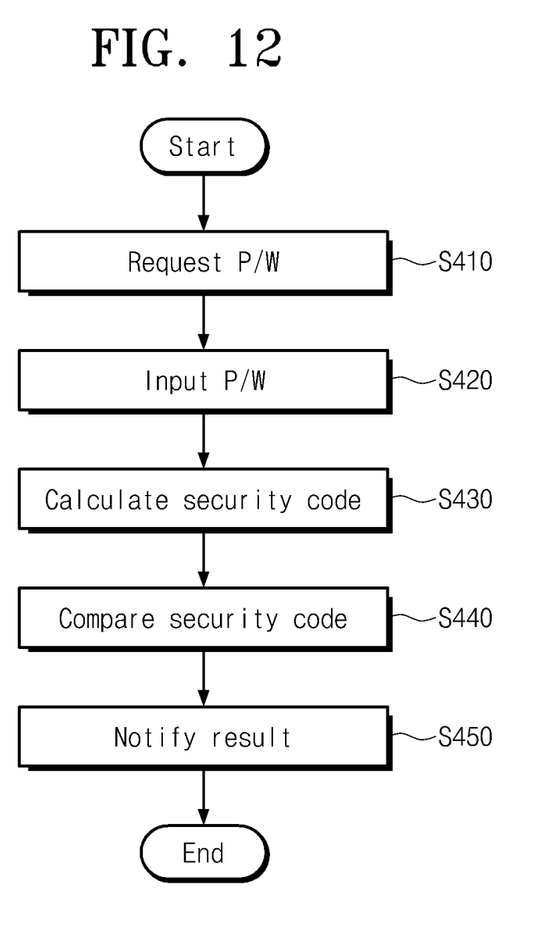

FIGS. 11 and 12 are flowcharts illustrating a method for setting and verifying a password of a user device according to another exemplary embodiment of the inventive concept. The user device according to another exemplary embodiment of the inventive concept may generate a security code using a password and DBI and may simply verify the password using the security code.

Referring to FIG. 11, in operation S310, an application may request the user device to input its password. In operation S320, the password is input in response to the request for inputting the password of the application. The application may repeatedly request the user device to input the password to securely use the application. In operation S330, the application may determine whether the password is an Nth (N is a natural number) password. When the password is not the $N^{th}$ password, operations 310 and 320 are repeatedly performed. When the password is the $N^{th}$ password, an operation of setting DBI may be performed.

Referring again to FIG. 11, in operation S340, the application may request the user device to select DBI. In operation S350, the DBI is input in response to the request for selecting the DBI of the application. The application may repeatedly request the user device to select the DBI to securely use the application.

In operation S360, the application may determine whether the DBI is an $M^{th}$ (M is a natural number) DBI. When the DBI is not the $M^{th}$ DBI, operations S340 and S350 are repeatedly performed. When the DBI is the $M^{th}$ DBI, in operation S370, an operation of making a security code may be performed. The security code may be made using the password and the DBI.

In operation S380, the security code may be saved. The password, the DBI, and the security code made using the password and the DBI may be saved in a memory of the user device or a server outside the user device. For example, the security code may be saved with a ***.php file name in the user device.

The security code may be saved together with the password and the DBI. When there is a problem in a storage space, a hash value of the DBI may be saved. For example, the password and the DBI may be saved below.

(Password, device binding information)
⇒ (Password, SHA-256(device binding information))

When unique user information in the user device is deleted, the user may set and use a password again.

FIG. 12 is a flowchart illustrating a method for verifying a password set in FIG. 11 according to another exemplary embodiment of the inventive concept. FIG. 12 illustrates a method for verifying a password in a user device to securely use an application (e.g., a banking application) according to another exemplary embodiment of the inventive concept.

In operation S410, the application may request the user device to input its password. In operation S420, the password is input in response to the request for inputting the password of the application. In operation S430, the application may receive the password and may calculate a security code. The security code may be calculated using the password and DBI corresponding to respective characters of the password. In operation S440, the application may compare a previously saved security code with the calculated security code. In operation S450, as a result of the comparison, the application may notify the user device of the result of whether the passwords are identical to each other. When the passwords are different from each other, the application may notify the user of the result that the passwords are different from each other. When the passwords are identical to each other, the corresponding application is executed.

The user device according to an exemplary embodiment of the inventive concept may simply verify the password using the security code. In other words, the user device according to an exemplary embodiment of the inventive concept receives only a password in a process of verifying the password. Although receiving only the password, the user device may internally verify the password through a security code using DBI. Therefore, according to an exemplary embodiment of the inventive concept, only a user having a specific user device may execute a corresponding application.

Figure 13:
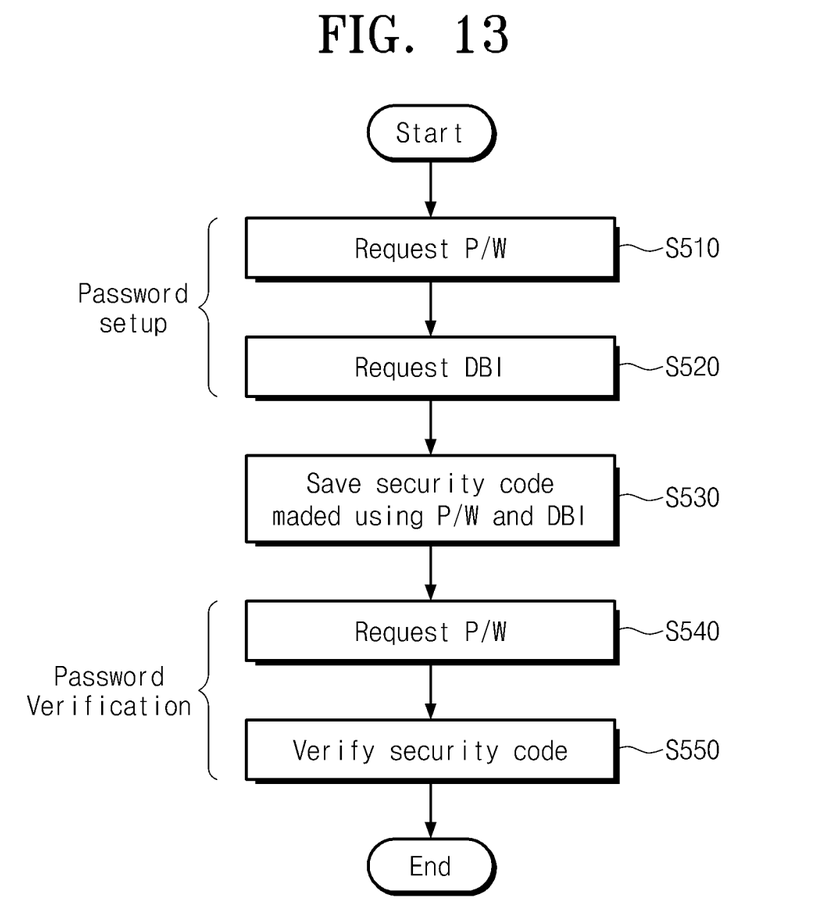
FIG. 13 is a flowchart illustrating an operating method of a user device according to an exemplary embodiment.

FIG. 13 is a flowchart illustrating an operating method of a user device according to an exemplary embodiment of the inventive concept. The user device may set a password, to which DBI is added, to securely use an application (e.g., a banking application). In a process of verifying a password of the application, although only the password is input, only when DBI are identical to each other, the application may be executed.

An operating method of the user device may be classified into a password setup step, a security code saving step, and a password verification step. In the password setup step, in operation S510, the application may request the user device to input its password. In operation S520, the application may request the user device to select DBI corresponding to respective characters of the password.

In the security code saving step, in operation S530, the application may generate a security code using the password and the DBI. The generated security code may be saved in a memory of the user device. Alternatively, the generated security code may be saved in a server outside the user device.

In the password verification step, in operation S540, the application may request the user device to input a password.

In operation S550, the application may receive the password and may verify a security code. The application may calculate a security code and may compare the calculated security code with a previously saved security code. When the passwords are different from each other, the application may notify the user of the result that the passwords are different from each other. When the passwords are identical to each other, the corresponding application may be executed.

The user device according to an exemplary embodiment of the inventive concept may use DBI when setting a password. Therefore, others know a password of the user, unless they do not have unique user information, they may not use a corresponding application by logging in to the application with a name of the user. Also, the user device according to an exemplary embodiment of the inventive concept may simply verify the password using the security code. In other words, although receiving only a password, the user device according to an exemplary embodiment of the inventive concept may verify the password through a security code using DBI.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for setting a password for operating an application of a user device, the method comprising:
   requesting, via the user device, an input of a password of the application; and
   requesting, via the user device, a selection of device binding information (DBI) of the user device to associate with the password,
   wherein the DBI is unique user information stored in the user device.

2. The method of claim 1, wherein the requesting the input of the password is repeated a predetermined number of times.

3. The method of claim 1, wherein the requesting the selection of the DBI is repeated a predetermined number of times.

4. The method of claim 1, wherein the DBI is obtained from one or more of contact information, a photo, an e-mail, a file, or an address.

5. The method of claim 1, wherein the DBI is matched with all of characters of the password.

6. The method of claim 1, wherein the DBI is matched with some of characters of the password.

7. The method of claim 1, further comprising:
   generating a security code using the password and the DBI.

8. The method of claim 7, further comprising:
   storing the security code in the user device.

9. The method of claim 7, further comprising:
   storing the security code in a server outside the user device.

10. A method for operating an application of a user device, the method comprising:
    setting a password of the application by requesting, via the user device, an input of the password and requesting, via the user device, a selection of device binding information (DBI) of the user device to associate with the password; and
    verifying the password to operate the application in which the password is set,
    wherein the DBI is unique user information stored in the user device.

11. The method of claim 10, further comprising:
storing a security code made using the password and the DBI.

12. The method of claim 11, wherein the verifying of the password comprises:
requesting, via the user device, an input of the password; and
verifying the security code using the password.

13. The method of claim 10, wherein the DBI is matched with all or some of characters of the password.

14. The method of claim 10, further comprising:
setting the password when the DBI is deleted.

15. A user device, comprising:
a wireless internet unit configured to communicate with at least one external device to execute an application;
an operating system configured to provide an environment to execute the application;
a memory configured to save a password of the application; and
an input and output interface unit configured to receive an input of the password,
wherein the application sets the password of the application by requesting, via the user device, the input of the password and requesting, via the user device, a selection of device binding information (DBI) of the user device to associate with the password,
wherein the DBI is unique user information stored in the user device.

16. The user device of claim 15, wherein the memory saves a security code made using the password and the DBI.

17. The user device of claim 15, wherein the DBI is matched with all or some of characters of the password.

\* \* \* \* \*